United States Patent [19]

Thompson

[11] 4,348,346
[45] * Sep. 7, 1982

[54] POLYESTER FILM EXTRUSION WITH EDGE BEAD CONTROL

[75] Inventor: Kenneth P. Thompson, Canton, N.C.

[73] Assignee: Champion International Corporation, Stamford, Conn.

[*] Notice: The portion of the term of this patent subsequent to Jun. 9, 1998, has been disclaimed.

[21] Appl. No.: 171,391

[22] Filed: Jul. 23, 1980

[51] Int. Cl.³ .............................................. B29D 7/02
[52] U.S. Cl. .................................... 264/146; 264/171; 264/210.1; 264/210.2; 264/210.6; 425/131.1; 425/133.5
[58] Field of Search ....................... 264/37, 146–147, 264/171, 210.1, 210.2, 210.6, 145; 425/131.1, 133.5, 466, 461–462

[56] References Cited

U.S. PATENT DOCUMENTS

| | | | |
|---|---|---|---|
| 2,364,435 | 12/1944 | Foster et al. | 264/210.1 |
| 2,982,995 | 5/1961 | Proleau | 425/466 |
| 3,072,962 | 1/1963 | McDermott et al. | 264/171 |
| 3,356,556 | 12/1967 | Violette et al. | 264/146 |
| 3,557,262 | 1/1971 | Mitchell et al. | 264/171 |
| 3,629,037 | 12/1971 | Masuda et al. | 264/171 |
| 3,865,665 | 2/1975 | Marion | 425/133.5 |
| 3,909,170 | 9/1975 | Riboulet et al. | 425/462 |
| 4,272,312 | 6/1981 | Thompson | 264/145 |

Primary Examiner—Jeffery R. Thurlow
Attorney, Agent, or Firm—Evelyn M. Sommer

[57] ABSTRACT

Disclosed is an improved process for extruding films of thermoplastic polyester film-forming materials. The process enables extrusion of films with reduced problems of neck-in, edge-weave and beading, by laminar flow feeding a small amount of a polymer into the extruder die in the area near both edges of the elongated die opening. The polymer laps said edge portions and thereby provides a controllable edge, which may be cut from the film after drawing the film from the die, and an increase in the usable film area for a given weight of polymer.

6 Claims, 4 Drawing Figures

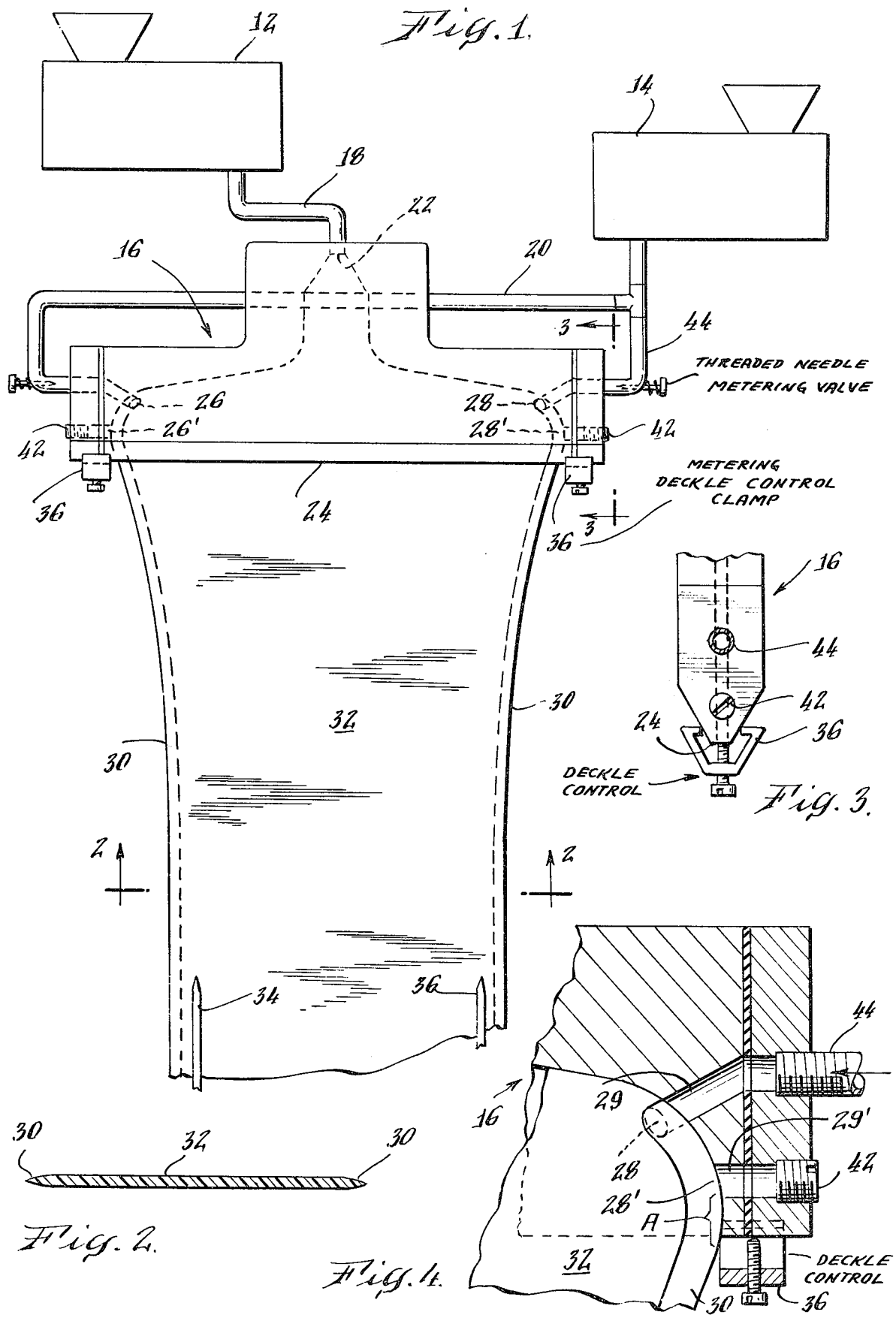

POLYESTER FILM EXTRUSION WITH EDGE BEAD CONTROL

BACKGROUND OF THE INVENTION

1. Field of the Invention

This invention relates to the production of extruded thermoplastic films, and more particularly to an improved process for preparing films from polyesters and laminates employing these films.

2. Description of the Prior Art

The number of uses for extruded plastic films in general and polyesters in particular, has increased steadily in recent years. Their uses in food packaging alone have accounted for much of the increased volume of polymer films used commercially. Films made of polyester materials are particularly useful in food packaging due to their good moisture barrier properties and their freedom from any harmful residues which may pass into the food materials. Polyester films have been particularly useful in packaging frozen foods, and laminates of polyesters on paperboard substrates are very suitable for forming rigid packaging structures which may be employed for transporting and storage of the foods as well as for use as cooking containers in microwave ovens.

There are essentially two methods for preparing films made of polyester resins. In one, a stream of molten polyester film-forming material is passed through an elongated sheeting die which has an elongated slit die opening. Upon exiting the die, the material is drawn from the die opening at a rate greater than the rate of extrusion. The film, drawn in this manner, is thinned out to a thickness suitable for the intended utility and can be cooled and rolled or coated onto a substrate prior to cooling.

In the other process for preparing polyester films, a circular die having an annular die opening is employed. The molten polymer is passed from the annular opening to form a tubular extrudate in which a gas is held under pressure to stretch the film in the direction transverse to the machine direction. Stretching in the machine direction can also be obtained by virtue of nip rollers which collapse the film and draw it from the die opening at a rate greater than the rate of extrusion.

Both of these extrusion procedures have their known advantages as well as limitations. When a particular set of conditions dictates the extrusion in the form of a flat film from a elongated sheeting die, there has always been the problem with polymers in general, and polyesters in particular, that the film tends to neck-in to an undesirable degree as it is drawn from the die opening. This neck-in causes a bead to form at the edges of the film and also causes the edge of the material to weave or otherwise become uneven. This problem is especially pronounced with the extrusion of polyester films. Because there are very few applications where a necked-in film can be used as is without trimming off the undesirable portions along the edges, there is a great deal of wastage involved not only in the polymer employed but, also any substrate to which it is applied in those cases where it is not practical to trim the film prior to laminating it to the substrate.

A number of procedures have been proposed to obviate the problem of heavy or uneven edges on extruder plastic materials in the form of films. One such proposal involves metering the extrudate with deckle rods, adapted to control the beading, disposed in the extrusion die. This is discussed, for example, in U.S. Pat. No. 2,982,995.

In another proposal for solving this problem, U.S. Pat. No. 3,356,556 suggests splitting the film longitudinally by means of at least one wire disposed in the path of the film prior to laminating the film at a suitable substrate. By maintaining the width of the film strip to less than about 1.5 inches, the problem of beading at the edge was not noticeable. However, this particular practice is not suitable for the formation of wider films, such as those required for use in food trays suitable for microwave heating or the like.

In another proposal for controlling the neck-in problem it is known that workers have attempted to provide means for holding either the inherently-formed or an intentionally-enlarged bead area to restrain the normal tendency of the film to decrease in width. However, this procedure has not been as successful as would be desired in view of the high capital and operating expenses required. Thus, there remains a need to provide an improved process for extruding polyester films to avoid these problems.

Accordingly, in my prior application, Ser. No. 90,403, filed Nov. 1, 1979, now U.S. Pat. No. 4,272,312 issued June 9, 1981 and entitled "Polyester Film Extrusion", I disclosed an improved process for producing polyester films from an elongated film-forming die which controls the neck-in, heavy uneven edge formation, and beading problems normally associated with extruding polyesters from these types of dies, which process increases the usable film area for a given weight of polymer.

The process for forming a film of polyester comprised the steps of: (a) heating and plasticizing the polyester; (b) feeding the heated and plasticized polyester to a die having an elongated die opening therein; (c) heating and plasticizing a second organic polymer; (d) feeding the heated and plasticized second organic polymer into the die and directing it toward the opposite ends of the elongated die opening sufficiently upstream of the opening to permit juxtaposition of the polyester and the second polymer in the areas in both opposite ends of the elongated die, thereby forming a composite stream of the polyester and second polymer; (e) extruding the composite stream from the elongated die opening to form a film comprising a central portion of the polyester and two opposed edge portions comprising an overlapped area of the polymer and the second polymer, the central portion of the polyester covering at least a major part of the width of the film; and (f) drawing the film from the die opening at a rate greater than the rate of extrusion to thereby reduce the thickness of the film. This process substantially reduced neck-in of the extrudate and unevenness of the extrudate edge by increasing the viscosity of the extrudate at a given temperature, thereby increasing the stiffness to pull out the otherwise fluid and unrestrained edge.

While this process was found to be generally satisfactory, it was also found that there is an apparent dead space behind a deckled area of the die. Polyester resin introduced into the die was being caught in this area and decomposed. The second polymer provides greater resistance to the polyester gasifying under decomposition, causing bubble formation adjacent the extrudate edge which makes the edges wavy and very erratic as they issue from the die, thus losing some of the control over the movement of the beaded edges of the extrudate.

SUMMARY OF THE INVENTION

By eliminating the decomposition effects, it was found that the neck-in movement and waviness of the deckled edge of the extrudate could be further quieted, resulting in even further improvements in the process yield, i.e. an increase in the usable film area for a given weight of polyester. This can be accomplished by introducing the controlled second polymer stream adjacent the edges of the die directly into the flowing extrudate stream of the first polyester spaced inwardly from, but adjacent to, its outer edges, in laminar, direct contact and impingement at the edge of the extrudate. This assures complete overlapping of the polyester and second polymer and elimination of any dead spaces adjacent the deckled area of the die in which any of the extrudate materials could accumulate and decompose more readily.

BRIEF DESCRIPTION OF THE DRAWINGS

The invention will become better understood and its advantages will become more apparent from the following detailed description and claims, especially when read in light of the attached drawings, wherein:

FIG. 1 is a schematic representation of one embodiment of the invention showing the injection of a second polymer into the die at the edge portions of a film being extruded;

FIG. 2 is a cross-section of the extruded film taken substantially along the plane indicated by line 2—2 in FIG. 1;

FIG. 3 is a cross-sectional view taken substantially along the plane indicated by line 3—3 of FIG. 1; and FIG. 4 is an enlarged cross-sectional view of the right hand corner of the die illustrated in FIG. 1.

DETAILED DESCRIPTION OF THE PREFERRED EMBODIMENT

The present invention provides an improved process for preparing polyester films with reduced neck-in, uneven and beaded edge formation and other problems associated with these known defects. The type of polyester resin employed is not critical in and of itself to the present invention, but can be any thermoplastic, film-forming polyester polymer or copolymer which is known to be subject to the noted deficiencies. Even extrudate materials such as nylon and polypropylene suffer from the noted deficiencies and the process disclosed herein could be applied to control the edges of such extrudates. The process of this invention involves the injection of a small amount of a second polymer into the edge portions of the die which forms the polyester material into a film. The second polymer may be any thermoplastic, organic, film-forming polymer which will improve the quality of edge formation of the film.

There are a wide variety of suitable polyester resins having desirable film-forming properties and good physical properties in the finally formed film. While any of these can be employed, it is preferred to use those having an intrinsic viscosity of within the range of from about 0.50 to 1.05, and most suitably, of about 0.70. Among the preferred polyester resins would be any one of those members selected from the group consisting of polyethylene terephthalate, polymethylmethacrylate, and blends and copolymers of these.

The preferred polyester is polyethylene terephthalate which is a polyester formed by the condensation reaction of ethylene glycol and terephthalic acid. These polyesters are well known and are more particularly described in U.S. Pat. No. 2,465,319 and U.S. Pat. No. 3,939,025. As used herein, the term "polyethylene terephthalate" is meant to include the polymers containing at least about 97% of repeating ethylene terephthalate units and copolymers of ethylene terephthalate as set forth in U.S. Pat. No. 3,939,025. Both of these referred-to patents are incorporated herein by reference in their entirety, and especially for the pertinent discussion of the polyester resins, their preparation, and the manner in which they are formed into films.

Among the suitable polymer materials for use as the second polymer according to this invention are the polyolefins, particularly any one of the members selected from the group consisting of high density polyethylene, low density polyethylene, medium density polyethylene, and polypropylene. The preferred polyolefins according to the present invention are the high density polyethylenes. The molecules of these materials do not lead themselves to growth of crystals as the polymers cool and solidify, and they typically have 75% or less crystallinity and densities of above about 0.940. Polyethylenes with densities of about 0.960 and a high melt index, e.g. about 30, are particularly preferred since they exhibit the proper viscosity range and do not exert a significant pull and straightening effect on the beading of the edge. These densities are expressed in terms of grams per cubic centimeter in accordance with ASTM test D792-50 method B, or ASTM test D1505-57T, as the case may be.

With this brief understanding of the nature of the materials which can be employed according to the present invention, attention is now directed to the drawings wherein FIG. 1 shows a schematic representation of one embodiment according to the present invention wherein a polyethylene terephthalate film-forming thermoplastic polymer is extruded into a film, and wherein a low density polyethylene is injected into the extrusion die prior to extrusion at the edge portion of the polyester film.

Two extruders 12 and 14 are shown which plasticize the polyester and the polymer overlapped with it and then feed these polymers to a film-forming die 16 via lines 18 and 20, respectively. The polyester material is fed into the die 16 at inlet 22 and is then spread out and flattened as it approaches elongated die opening 24 from which it is extruded as a film. The second, polymer is fed into the die 16 at inlets 26 and 28 near the edge of the stream of melted and plasticized polyester as it is being flattened to form a film. The second polymer is fed to the edge portions of the polyester stream sufficiently upstream of the die opening 24 to permit commingling and intimate physical mixing of the two polymers. In the exemplary case of polyethylene as the second polymer, a milky-white mixture is formed on the two materials. This is shown generally in the drawings as edge 30. This can also be seen in the cross-sectional view of FIG. 2.

Upon exiting the die opening 24 the film 32 is drawn and thereby thinned by nip rollers, not shown. These rollers draw the film from the die opening 24 at a rate greater than the rate of extrusion to thereby thin it out and improve its mechanical properties. The drawing or stretching operation causes, however, the undersirable neck-in or decrease in width shown in FIG. 1 whereby the effective width of the film is decreased. In the normal circumstance where the present invention is not employed to inject the second polymer at the edges of the film, the necking is more pronounced than in the present case and, the area near the edge portion shown as 30, will typically be in the shape of a bead which can have a thickness of five times or more of the central portion of the film 32. The edge portion 30 of the film 32 would also typically be uneven and somewhat wavy. This problem is reduced by the added weight and bulk at the edge of the extrudate provided by the second polymer at the edge of the polyester stream. The net effect of the present invention, then, is to make the process of extruding a polyester resin more controllable, in that the edge weaving problem is minimized, and also to improve the efficiency of the operation because the neck-in and bead formation are minimized, thereby leaving more of a usable center portion of the film 32 for practical purposes, per given weight of polyester.

If desired, the film 32 can be used with the edge portion 30 attached where this will not affect utility. Thus, there may be some bag forming or laminating procedures which require first quenching the film and subsequently heat sealing it where an edge portion would normally have to be removed after such further processing step. In situations like this, there would be no need to pretrim the edge portion 30. Further, there may be some utilities where the milky-while edge portion 30 could provide some decorative effect. Preferably, however, the edge portion is severed from the central portion of film 32 by suitable means such as knives or heated wires shown positioned as at locations 34 and 36 in FIG. 1. The film can be quenched either before or after severing of the edge portion 30.

Examples of the improved extrudate are given in my copending application, Ser. No. 90,403, filed Nov. 1, 1979 now U.S. Pat. No. 4,272,312 issued June 9, 1981 and are incorporated herein by reference.

It has also been found that the entrance points or inlets for the second polymer should be positioned so as to provide maximum commingling of the second polymer with the polyester to obtain even greater yields under the benefits of the present invention.

For example, it was found that there was a dead space A behind the deckled area of die 16 (See FIG. 4). This dead space was formed by introducing the second polymer through inlets 26' and 28' substantially perpendicular to the outer edge of the polyester, which pushes the edge away from area A, creating a dead space or void not in the path of flow of the edge of the extrudate. Polyester resin introduced into die 16 could be caught and accumulate in this area A and decompose, precluding to some extent adequate overlapping of the second polymer with the polyester along the edge of the extrudate, losing some of the control over the movement of the beaded edge of the extrudate.

This problem was eliminated by plugging the passages to inlets 26' and 28' with a threaded plug 42 and connecting the pipes 20 and 44 from extruder 14 to inlet passages 29 on both sides of die 16. Passages 29, which terminate in inlets 26 and 28, open in the die 16 beneath the polyester flow path inwardly of its outer edge, rather than directly perpendicular to its outer edge. This not only eliminates dead space A, but increases the commingling and lapping at the point of juxtaposition of the polyester and second polymer.

What is claimed is:

1. A process for forming a film of a thermoplastic film-forming, polyester comprising the steps of:
   (a) heating and plasticizing the polyester;
   (b) feeding the heated and plasticized polyester to a die having an elongated die opening and a deckled area therein, thereby producing a flowing stream of the polyester;
   (c) heating and plasticizing a second organic polymer;
   (d) feeding the heated and plasticized second organic polymer into the die and directing it into the flowing stream of the polyester adjacent to but spaced inwardly of the steam's outer edges and sufficiently upstream of the elongated die opening to eliminate the existence of any dead spaces adjacent said deckled area where said polyester or second polymer could accumulate and to permit overlapping of the polyester and the second polymer in the areas near both opposite edges of the elongated die, thereby forming a composite stream of the polyester and second polymer;
   (e) extruding the composite stream from the elongated die opening to form a film comprising a central portion of the polyester and two edge portions of the polyester and the second polymer, the central portion of the polyester covering at least a major part of the width of the film; and
   (f) drawing the film from the die opening at a rate greater than the rate of extrusion to thereby reduce the thickness of the film.

2. A process according to claim 1 wherein the polyester comprises a member selected from the group consisting of polymethylmethacrylate, polyethylene terephthalate, and blends and copolymers of these.

3. A process according to claim 1 wherein the second polymer is a polyolefin.

4. A process according to claim 1 wherein the polyolefin is a low density polyethylene, medium density polyethylene, high density polyethylene or polypropylene.

5. A process according to claim 1 wherein the polyolefin is a high density polyethylene.

6. A process according to claim 1 wherein the edge portions of the resulting film, which comprise the polyester and the second polymer, are severed from the film.

* * * * *

UNITED STATES PATENT AND TRADEMARK OFFICE
CERTIFICATE OF CORRECTION

PATENT NO. : 4,348,346
DATED : September 7, 1982
INVENTOR(S) : Kenneth P. Thompson It is certified that error appears in the above—identified patent and that said Letters Patent is hereby corrected as shown below:

In Column 2, line 6, delete "at" and insert in lieu thereof -- to -- .

In Column 4, line 20, delete "lead" and insert in lieu thereof -- lend -- .

In Column 4, line 55, delete "on" and insert in lieu thereof -- of -- .

In Column 6, line 22, delete "steam's" and insert in lieu thereof -- stream's -- .

Signed and Sealed this

Nineteenth Day of July 1983

[SEAL]

Attest:

GERALD J. MOSSINGHOFF

Attesting Officer

Commissioner of Patents and Trademarks